(12) United States Patent
Macheras et al.

(10) Patent No.: US 6,290,756 B1
(45) Date of Patent: Sep. 18, 2001

(54) HOLLOW FIBER MEMBRANE TUBESHEETS OF VARIABLE EPOXY COMPOSITION AND HARDNESS

(75) Inventors: James Timothy Macheras, Quincy; Cheryl Ann Ford, Wareham; Joyce Katz Nelson, Lexington, all of MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 08/984,633

(22) Filed: Dec. 3, 1997

(51) Int. Cl.[7] ............... B01D 53/22; B32B 31/00
(52) U.S. Cl. .............. 96/8; 96/10; 210/321.8; 264/261; 264/279; 156/294
(58) Field of Search ............ 96/8, 10; 210/500.23, 210/321.8, 321.89, 321.88, 321.87, 321.79, 321.61; 264/261, 279; 156/294; 428/217

(56) References Cited

U.S. PATENT DOCUMENTS

| | | |
|---|---|---|
| 3,228,876 | 1/1966 | Mahon . |
| 3,422,008 | 1/1969 | McLain . |
| 3,504,060 | 3/1970 | Gardner . |
| 3,728,425 * | 4/1973 | Schraeder ............... 264/49 |
| 4,049,765 * | 9/1977 | Yamazaki ............... 264/261 |
| 4,207,192 | 6/1980 | Coplan et al. . |
| 4,323,454 * | 4/1982 | Fritzsche et al. ........... 210/321.61 |
| 4,389,363 | 6/1983 | Molthop . |
| 4,430,807 * | 2/1984 | Davis et al. ............... 34/342 |
| 5,192,478 * | 3/1993 | Caskey ............... 264/139 |
| 5,639,373 * | 6/1997 | Mahendran et al. ......... 210/636 |
| 5,897,729 * | 4/1999 | Bikson et al. . |

FOREIGN PATENT DOCUMENTS

| | | |
|---|---|---|
| 062307B1 | 9/1997 | (EP) . |
| 2066697 | 7/1981 | (GB) . |
| 63171607 | 7/1988 | (JP) . |
| 4-334529 | 11/1992 | (JP) . |
| 06114242 | 4/1994 | (JP) . |

OTHER PUBLICATIONS

Araldite DY 025 product data sheet. CIBA–GEIGY resins department, 1984.*
Lee et al. "Handbook of Epoxy Resins". McGraw Hill. pp. 13–7 and 13–17, 1982.*
Isreal Cabasso, Elias Klein and James K. Smith, "Polysulfone Hollow Fibers" Gulf South Research Institute, New Orleans, LA, Chapter IV (Date Available).

* cited by examiner

Primary Examiner—Ana Fortuna
Assistant Examiner—Richard W. Ward
(74) Attorney, Agent, or Firm—Robert J. Follett

(57) ABSTRACT

Multicomponent hollow fiber membrane tubesheets are disclosed that provide for improved membrane performance, particularly at high operating pressures. The multicomponent tubesheets have an epoxy resin having, when cured, different degrees of hardness in different portions of the tubesheet. Methods for producing such multicomponent tubesheets are also provided.

20 Claims, 3 Drawing Sheets

HOLLOW FIBER MEMBRANE TUBESHEETS OF VARIABLE EPOXY COMPOSITION AND HARDNESS

FIELD OF THE INVENTION

This invention relates to semipermeable hollow fiber membrane devices that contain multicomponent epoxy resin tubesheets with a variable composition along the tubesheets axial length. Physical and mechanical properties along the axial length of the tubesheet are varied and tailored to improve the performance of the hollow fiber membrane device, in particular at high transmembrane operating pressures.

BACKGROUND OF THE INVENTION

Processes that use membranes to separate mixtures of various fluids including gases are accepted applications in many industries. Representative of these processes are microfiltration, ultrafiltration, reverse osmosis, and gas separation. Membranes used to accomplish these separations have been fabricated in various geometries, such as flat sheet, spiral wound flat sheet, tubular, and hollow fibers. The type of membrane shape is usually dictated by the nature of the separation that is to be effected. When performing a separation on a viscous liquid mixture, for instance, it may be advantageous to use a membrane in a large diameter tubular configuration in order to maintain fluid velocity and to minimize fouling of the membrane surface. Conversely, when separating fluids with low viscosities, such as gases, the use of membranes in a hollow fiber configuration is more appropriate.

The fine hollow fiber geometry for membrane fabrication is particularly advantageous because it can yield very high surface area-to-volume ratios. Much of this benefit is derived from the fact that the membrane support structure is integral to the hollow fiber; that is, the membrane is a self-supporting entity. This is in contrast to flat-sheet membranes that are typically cast onto a nonwoven fabric, or to tubular membranes that are frequently cast onto a rigid porous backing tube. Thus, a significant portion of the module volume of flat-sheet, spiralwound, and tubular membranes is consumed by the membrane support structure. This volume is consequently unavailable for packing such modules with additional active membrane area.

Commercially, large bundles of hollow fiber membranes are assembled into permeators or modules. The fibers in these modules are sometimes arranged in a parallel fashion, although it is often advantageous to wind the fibers around a core to impart structural integrity to the bundle. As part of the hollow fiber membrane module fabrication process, at least one end of the fiber bundle is cast or potted in what is commonly referred to as a tubesheet. More commonly, both ends of the bundle are so encapsulated. The tubesheet serves to hold the fibers in a fluid-tight relationship such that the feed fluid is isolated from the permeate fluid, thus allowing components of the fluid to be separated by selective passage of one or more components of the feed mixture through the membrane.

Tubesheets can be fabricated by using any one of a number of liquid resinous materials that subsequently solidify, frequently through a chemical curing process. Typical of such resinous compounds used for casting such tubesheets are thermoset polyurethane and epoxy resins. The liquid resin may be applied to the ends of the hollow fiber bundle by any suitable means. Fritzche et al. in U.S. Pat. No. 4,323,454 describe a process in which a hollow fiber bundle is placed in a mold while a liquid resinous composition of relatively low viscosity is poured into said mold. McLain, in U.S. Pat. No. 3,422,008 makes use of a resin applicator to form the tubesheet in a membrane module in place even as the hollow fibers are being wound into a bundle around a core. It is understood that the physical characteristics of the liquid resin can be chosen to suit the particular method of application.

The properties of the cured resinous composition must meet the demands of the particular application of the membrane module. Thus, the requirements for the tubesheet of a hollow fiber membrane module used for low pressure separation of dissolved solids in liquids may be different from the requirements for the tubesheet of a hollow fiber membrane module used to separate gaseous components at high pressure. With respect to hollow fiber membrane modules used for gas separation, there are several properties of the tubesheet that are commonly desirable. First, the cured resin must be of sufficient strength to withstand the pressure differential across the tubesheet during operation of the module. Frequently, the feed pressure of the gas can be in excess of 80 atmospheres and consequently the differential pressure across the tubesheet will approach this value if the permeate pressure of the membrane approaches atmospheric pressure. In addition, the solidified resinous mixture comprising the tubesheet must also be amenable to being cut or severed in a clean fashion such that the bores of the hollow fibers can be opened to allow free passage of gas along the length of the hollow fibers. Finally, the cured resin must exhibit good flexibility and adhesion to the hollow fibers to maintain a fluid-tight relationship between the hollow fibers and the tubesheet, thus preventing unwanted species in the feed stream from mixing with the permeate.

It is frequently found, however, that meeting all these requirements in a single component tubesheet material is difficult. For instance, cured resinous materials that exhibit high strength commonly possess high glass transition temperatures ($T_g$) While such intractable materials have the high degree of hardness and tensile strength desired for high pressure operation, their adhesion and flexibility characteristics are generally inferior to softer, lower $T_g$ materials. As suggested above, poor adhesion of the tubesheet material to the hollow fiber can result in undesirable mixing of feed and permeate components during operation of the module. Thus, it is frequently required to make compromises to the characteristics of a single component tubesheet. In most cases the bulk strength and hardness of the tubesheet cannot be compromised in order to avoid catastrophic module failure; thus membrane modules are manufactured with tubesheets that exhibit less than optimal adhesion and flexibility characteristics at the hollow fiber tubesheet interface. These deficiencies of the tubesheet in the interface area can lead to poor membrane module performance.

FIG. 1 depicts this critical area of the hollow fiber membrane module known as the interface for a conventional hollow fiber membrane. Hollow fibers 1 with porous walls 2 are encapsulated in an appropriate resin that forms the tubesheet 5 in a manner such that the hollow fiber bores 3 remain open. The interface region 6 is the area at the boundary between the potted and unposted segments of the hollow fibers in the tubesheet that is distal to the terminal end of the tubesheet 7.

Frequently there is no clear demarcation line at the interface region because of the condition known as wicking. Wicking occurs when the liquid potting compound is drawn up the interstices 4 between the hollow fibers by capillary action to form an irregular resin boundary 6 on the fibers.

This wicked portion of the resin can form sharp, hard structures of varying lengths against the bases of the hollow fibers. While the exact mechanism for membrane performance failure due to defects at the interface region is not known, it is believed that this failure is related to the manner in which the modules are operated and the mechanical dissimilarity of the hollow fibers and the potting resin.

Hollow fiber membranes are operated in one of two modes: bore-side feed flow or shell-side feed flow. In the former, the fluid to be processed is fed into the bore side of the fiber and the permeate flows through the membrane walls and into the so-called shell side of the module. In the latter mode of operation, the feed fluid is delivered to the shell side of the membrane and the permeate is collected through the fiber bores. The shell-side feed mode of operation is commonly used in gas separation membrane modules wherein cross-membrane differential pressure is high. When membranes are operated in this mode, the fiber is subject to compression from forces exerted by the feed fluid. Because the hollow fibers are typically composite or asymmetric in structure and constructed from polymeric materials with a large bulk void volume, the fiber can compress under extreme external cross-membrane pressure. This distortion of the fiber's original shape can cause membrane leakage if the membrane is torn away from the rigid tubesheet material. This particular type of defect also can be caused by mechanical vibration or pressure surges that can occur during operating of the module. These defects share the same root cause, however, which is the movement of the flexible, compressible hollow fiber membrane away from the rigid tubesheet material at the module interface.

There have been many processes disclosed in the prior art that attempt to produce a durable leak-free tubesheet for hollow fiber membrane modules. Molthop, in U.S. Pat. No. 4,389,363, cites the use of an elastomeric urethane potting compound for encapsulating hollow fibers in dialysis membrane modules. While such resilient compounds may form a durable tubesheet for low pressure fluid separation applications, they are unsuitable for use in high pressure gas separation modules because they lack the mechanical strength and temperature capability that are required in such processes.

Coplan et al. in U.S. Pat. No. 4,207,192 disclose the application of a ring of rubber cement to a hollow fiber membrane bundle before the tubesheet is formed. This ring of cement acts as a barrier to prevent undue wicking of the potting compound. Because this material is applied prior to potting, there exists the possibility of air gaps between the two material layers. These gaps are sites of unprotected interface that can be accessed by the process fluid should the adhesive bond between the two materials fail.

Hayashida et al. in Japanese Early Disclosure Patent Application Hei4-334529 disclose the application of a silicone protective resin at the interface area of a hollow fiber membrane module. The silicone resin is applied after the fibers have been potted in an epoxy resin tubesheet. It is noted that while the silicone resin is normally placed adjacent to the tubesheet resin, the two layers do not necessarily contact one another. It is also stated that if the gap between the two layers is too large, the effectiveness of the protective layer is diminished.

Cabasso et al. in a report prepared for the Office of Water Research and Technology under Contract Number 14-30-3165, reported on the use of silicon rubber at the potting interface. Cabasso et al. used a silicon rubber cap over the epoxy potted region of the module to reduce epoxy wicking and to minimize membrane failure in this region of the module. It is further reported that the silicon rubber cap did not completely eliminate the failures.

Thus there still exists a need for a hollow fiber potting process that yields high strength and durability to tubesheets that can withstand high differential pressures and maintain a fluid-tight defect-free seal with the fibers under these extreme operating conditions.

OBJECTS OF THE INVENTION

It is therefore an object of the invention to provide a potting process for hollow fiber membranes that yields tubesheets having high strength and durability.

It is a further object to provide hollow fiber membranes having high strength and durability.

It is a further object of the invention to provide membrane tubesheets, and a process for making them, that can withstand high differential pressures and maintain a fluid-tight defect-free seal with the hollow fibers under these extreme operating conditions.

SUMMARY OF THE INVENTION

This invention pertains to a method of manufacturing multicomponent tubesheets that lead to improved performance of fluid separation hollow fiber membrane modules, particularly gas separation modules. The improvements in module performance are preferably obtained through the use of multicomponent tubesheets made from a single type of a material, such as epoxy resin, that has a different chemical composition and thus different mechanical properties along the tubesheet axial length. We should note that the axial direction is defined as the axis between the tubesheet interface and the terminal end that generally coincides with the overall direction of hollow fibers traversing the tubesheet. The difference in mechanical and physical properties of the tubesheet is achieved by the use of at least two distinctly different chemical formulations of potting materials within the tubesheet. In a preferred embodiment the tubesheet is cast such that the terminal portion of the tubesheet is hard, rigid, and of high mechanical strength while the portion of the tubesheet that contacts the fibers in the interface is soft and flexible. The hard portion of the tubesheet thus provides the durability required of the module at high pressures and temperature of operation while the soft portion of the tubesheet protects the hollow fibers from damage. The hard and soft portions of the tubesheet are in intimate contact with one another.

The multicomponent tubesheets of the present invention include both tubesheets that separate feed from the permeate end and operate under cross differential pressure and hollow fiber bundle caps; furthermore, the invention relates to both shell side and bore side feed modules. Novel processes to manufacture multicomponent tubesheets are further disclosed.

BRIEF DESCRIPTION OF DRAWINGS

Other objects, features and advantages will occur to those skilled in the art from the following description of preferred embodiments and the accompanying drawings, in which.

DETAILED DESCRIPTION OF THE INVENTION

Figure 1:
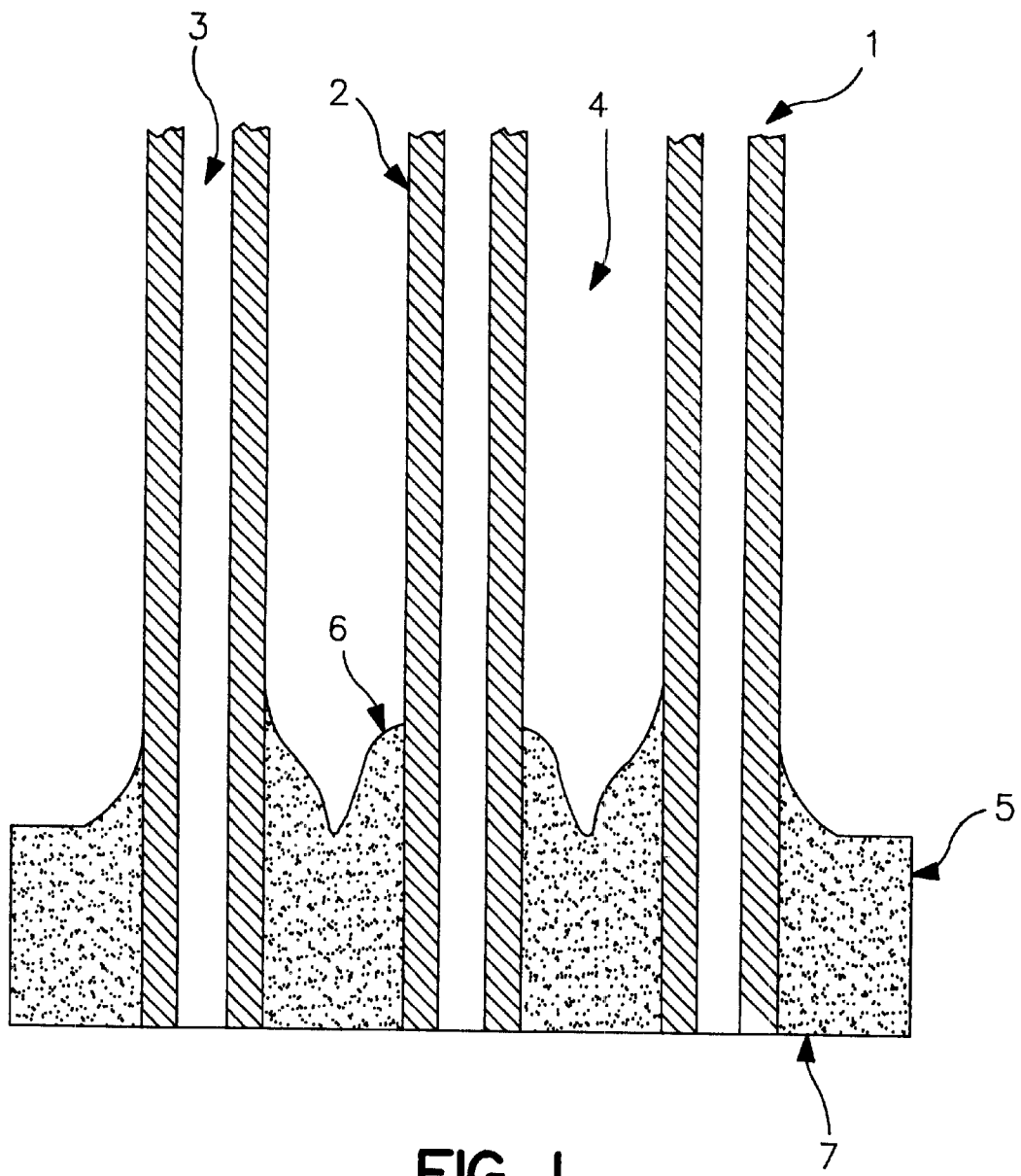
FIG. 1 is a schematic presentation of a single component tubesheet that is representative of the prior art.

The multicomponent tubesheets of this invention are formed by applying at least two distinct resin systems to an appropriate region of the hollow fiber bundle. The tubesheets of this invention are characterized by a difference in hardness along their axial length wherein the harder portion of a tubesheet is located at the module terminal ends while the softer portion is located in the interface region of the tubesheet. The difference in hardness between the hard and soft regions of the tubesheet should be at least 10 units, preferably at least 20 units, on the Shore D scale when measured at 25° C. We should note that for the purposes of this disclosure, all Shore D and Rockwell M measurements were at 25° C.

Accordingly, the sections of the fiber adjacent to the unposted or active membrane region are encapsulated in the softer resin. The resin formulations are applied to the bundle in such a manner that the cured layers are in intimate contact with one another. Thus there are substantially no air gaps between the layers of resin since such gaps can be a source of defects. In a preferred embodiment, the various resinous compositions used to fabricate the composite tubesheets of the present invention should be formed from the same class of chemical compounds, i.e., epoxy resins, producing a multicomponent tubesheet with a substantial degree of affinity and adhesion between its layers. Preferably a chemical bonding will exist between the layers.

Preferred materials used to fabricate the tubesheets of this invention are liquid resinous epoxy compounds that can be solidified through a chemical curing process. Particularly preferred resins for use in this invention are epoxies incorporating bisphenol A or bisphenol F moieties in their structures. The extensive availability of such resins as well as the appropriately compatible diluents, modifiers, fillers and hardeners permit one skilled in the art to formulate castings with a wide range of properties in keeping with the intent of this invention.

The properties of castings prepared from epoxy resins are greatly influenced by the type and amount of hardener used to cure the system. There are many classes of compounds that can be used to cure epoxy resins for the purpose of fabricating permeator tubesheets. Such compounds include, but are not limited to, polyamides, polyamidoamines, aliphatic amines, and aromatic amines.

The mechanical characteristics of some epoxy systems cured with such hardeners are described in "Handbook of Epoxy Resins", by Henry Lee and Kris Neville, McGraw Hill, Inc., 1982, hereinafter referred to as Lee and Neville. For example, in Table 8-1 of this book it is shown that a casting prepared from a bisphenol A epoxy (BPA) resin cured with meta-phenylene diamine, an aromatic amine hardener, has a tensile strength of 8,000 psi, heat defection temperature of 155° C., an elongation of 3.5%, and a Rockwell M hardness of 112. These properties would qualify this particular material as hard and inflexible. Another resin system that would fall into this category is described in Table 16-4 of Lee and Neville. In this instance, a BPA resin cured with the cycloacliphatic polyamine N-aminoethyl piperazine (N-AEP) yielded a casting with a tensile strength of 12,560 psi, an elongation of 6.6%, and a Shore D hardness of 89. Resin systems with properties such as these are typically required to prepare tubesheets for hollow fiber gas separation modules. The deficiencies of using these materials in single component tubesheets have been described above.

It is also possible to prepare softer epoxy resin castings with a high degree of flexibility. Table 10-2 of Lee and Neville describes a BPA resin cured in a 1:1 ratio with a polyamidoamine. The casting prepared from this system has a tensile strength of only 1,780 psi, a 70% elongation, and a Shore D hardness of 55. This soft, flexible casting was prepared from the same type of resin that produced the hard castings of the previous two examples. The physical characteristics of the casting were changed dramatically by simply utilizing another type of hardener in the appropriate mix ratio. Another method of producing a soft epoxy casting is illustrated in Table 16-4 of Lee and Neville. In this instance, a portion of the BPA resin is substituted with an epoxidized polyol that yields an increase in the flexibility of the casting. Thus, a casting prepared from a resin consisting of 20/80 BPA epoxy/epoxidized polyol and cured with N-aminoethyl piperazine has a tensile strength of 1,445 psi, an elongation of 62%, and a Shore D hardness of 60. These properties are in stark contrast to those of the BPA/N-AEP cured casting cited above.

In a preferred embodiment of the invention, multicomponent tubesheets are formed that combine hard and soft epoxy resin layers in intimate contact with one another, but that differ in Shore D hardness by at least 10 units, within a single hollow fiber membrane module tubesheet. By the term "hard" we mean a resin having a Shore D hardness greater than that for the soft resin, and preferably greater than about 80 units, more preferably greater than about 85 units. By the term "soft" we mean a resin that has a Shore D hardness that is less than that of the hard resin, and preferably having a Shore D hardness of less than about 80 units, more preferably less than about 60 units.

It is further preferred that the softer portion of the tubesheet contact the fiber bundle in the interface region of the module and that the harder portion of the tubesheet be located at the extremities of the module ends, i.e., terminal end. Controlling the hardness of the tubesheet in these locations protects the fiber from mechanical damage and provides the necessary strength to the tubesheet as a whole. It is understood that the multicomponent tubesheet can be comprised from layers of distinctly different composition and softness or can comprise a continuous gradation of the composite and properties along the axial direction.

The weight ratio of hard epoxy to soft epoxy used to fabricate the multicomponent tubesheet before any cutting or machining operations are performed to open hollow fiber bores can vary substantially and will depend on the intended use of the hollow fiber module as well as the particular method of fabricating the tubesheets. The weight ratio of hard epoxy to soft epoxy can vary from about 1000:1 or more to about 0.1:1 or less, preferably it is above 1:1, most preferably it is above 10:1.

The soft epoxy resin that comprises the fiber/tubesheet interface layer can be prepared by a number of methods. One method involves the incorporation of a diluent into the epoxy formulation used to form the soft section of the tubesheet. The diluent may be either nonreactive or reactive, and can be used in any amount required to yield the desired degree of hardness to the cured casting. Nonreactive diluents that may be used in this invention include, but are not limited to: hydrocarbons, including xylene and styrene, fatty acid esters, and esters of phthalic acid. A particularly preferred nonreactive diluent is dibutylphthalate.

Reactive materials that may be advantageously employed to tailor the hardness of the tubesheet include monoepoxy diluents and low viscosity epoxy resins. Among the preferred compounds in this class are butyl glycidyl ether, cresyl glycidyl ether, $C_6$–$C_{14}$ alkyl glycidyl ethers, and the diglycidyl ethers of neopentyl glycol and butanediol. A particularly preferred reactive diluent is the diglycidyl ether of 1,4 butanediol.

Another method of modifying the hardness of the interface portion of the epoxy tubesheet that is in contact with the hollow fibers is to formulate this portion of the epoxy compound with a stoichiometric excess of curing agent. This method may be particularly suitable when the epoxy formulation is cured with hardeners that have nonspecific curing ratios. Among these types of epoxy hardeners are polyamides, imidazoline polyamines, and polyamidoamines. Polyamidoamines are particularly preferred because of the wide range of reactivity and low viscosities available in this class of compounds.

Another method of modifying the hardness of the interface portion of the epoxy tubesheet is to apply a hardness modifying agent to the interface of an uncured or partially cured hard epoxy layer. The hardness modifying agent can be reactive or nonreactive diluents such as discussed above. Particularly useful materials include functional siloxanes, in particular epoxy and amino functional siloxanes such as GP4® sold by Genessee Polymers Corp. It is understood that these epoxy formulations and modifying agents should not dissolve or otherwise adversely affect hollow fiber membranes.

In another embodiment of the invention the liquid resinous epoxy compounds and epoxy hardness modifiers that form the soft portion of the tubesheet are formulated from low viscosity materials, i.e., low enough to facilitate their introduction into the hollow fiber bundle. To this end, the use of the aforementioned diluents and/or hardeners that impart softness and flexibility to the cured resin may be advantageously employed to depress the viscosity of the liquid resin. For proper introduction into the hollow fiber bundle of the soft epoxy resin in its liquid state or an epoxy hardness modifying material, viscosity of the material should be below about 1500 centipoise at 25° C. A viscosity of below 1000 centipoise at 25° C. is preferred and a viscosity below about 500 centipoise at 25° C. is most preferred.

Figure 2:
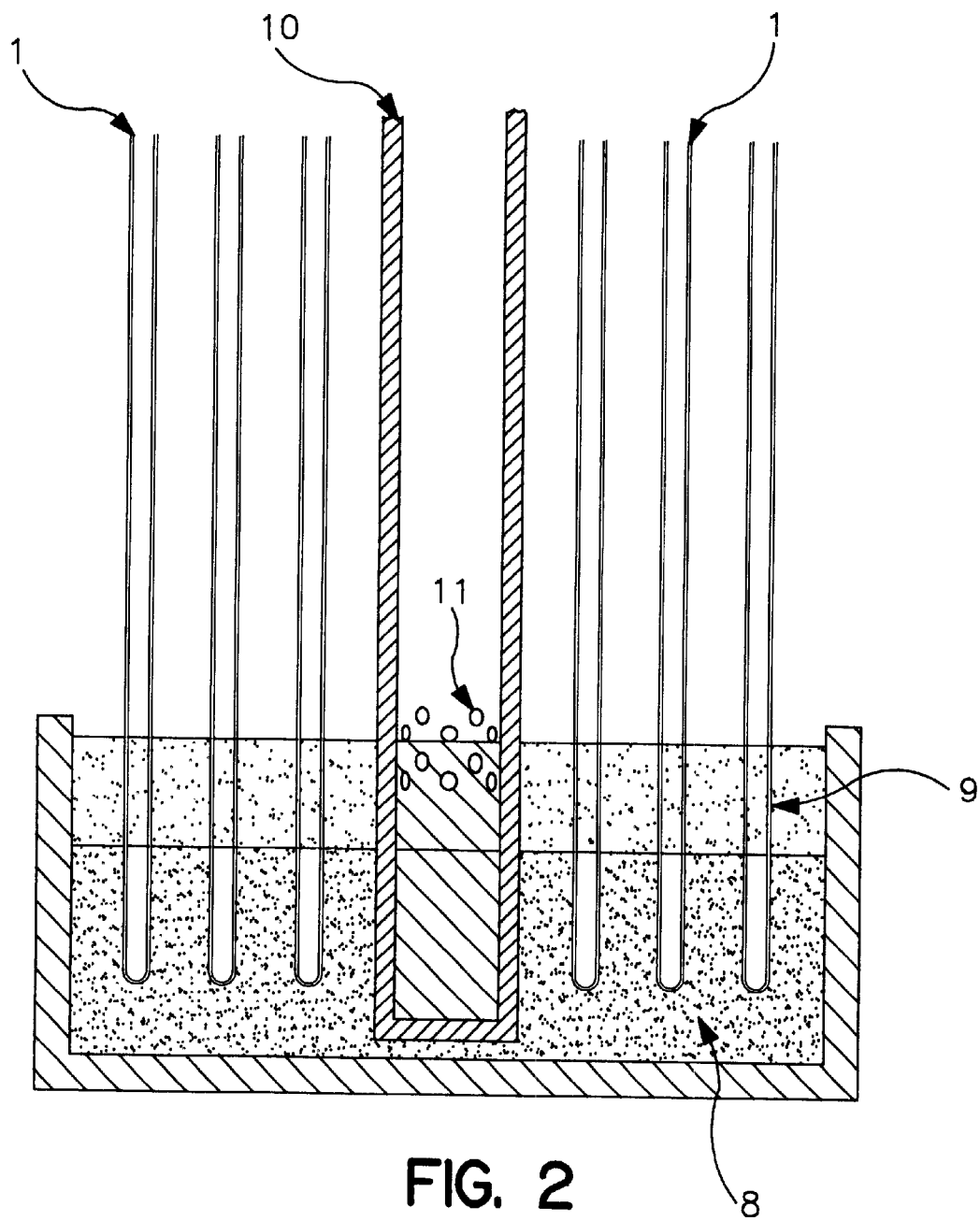
FIG. 2 shows one method of preparation of the multicomponent tubesheets of the present invention.

The tubesheets of the present invention that are composed of both hard and soft epoxy compounds may be fabricated by a number of methods. FIG. 2 illustrates one such method of fabrication.

As shown in FIG. 2, a hollow fiber membrane module is potted in any convenient manner such that the hollow fibers 1 are embedded in the hard formula epoxy portion 8 of the tubesheet. Following complete or partial cure of the hard epoxy layer, a soft epoxy 9 layer is applied to the interface region. If a hardness modifying liquid is used rather than a soft epoxy formulation, the material is introduced before the hard epoxy layer is completely cured. This method may be advantageous if a thin layer of soft epoxy is required in the multiple component tubesheet. It is understood that there may be a variable degree of adhesion between the epoxy layers even though they are in intimate contact with one another if the soft epoxy material is introduced after the hard layer has been substantially cured.

The thin layer of soft epoxy resin compound may be applied by depositing the liquid resin at the periphery of the hollow fiber bundle followed by a wicking step, wherein the liquid epoxy is permitted to wick into the interior of the bundle over time. Another variation of this method may be used when the hollow fiber membrane device is constructed with a central core or mandrel, as shown in FIG. 2.

Again referring to FIG. 2, the liquid soft epoxy compound is poured down the mandrel 10 and exits through holes 11 in the mandrel. The liquid soft epoxy 9 then flows from the center to the periphery of the bundle covering the hard epoxy layer 8. The benefit of employing a very low viscosity (e.g. 1000 cps or less at 25° C.) soft epoxy compound with a relatively long work life (e.g. 2 hours or more) will be apparent to those skilled in the art of membrane module fabrication.

In a preferred embodiment of this invention, a mold is partially filled with the liquid resinous epoxy mixture that forms the hard portion of the casting. The hollow fiber bundle is lowered into the mold such that the end of the bundle is encapsulated in this first hard resin layer. The remainder of the mold volume is then backfilled with the second liquid resinous epoxy mixture that forms the soft portion of the tubesheet. This method may be advantageously employed when a thick layer of soft epoxy is needed and/or if a high degree of interaction and bonding between the layers is desired. The casting is allowed to cure and then is postcured at the appropriately elevated temperature to impart final thermal and mechanical properties to the epoxy resin materials.

In yet another embodiment of this invention, the hard and soft epoxy compounds are applied in a one-step operation. A striated layer of soft epoxy resin is formed on top of the hard epoxy resin and the terminal end of the hollow fiber bundle is encapsulated in a one-step process.

Figure 3:
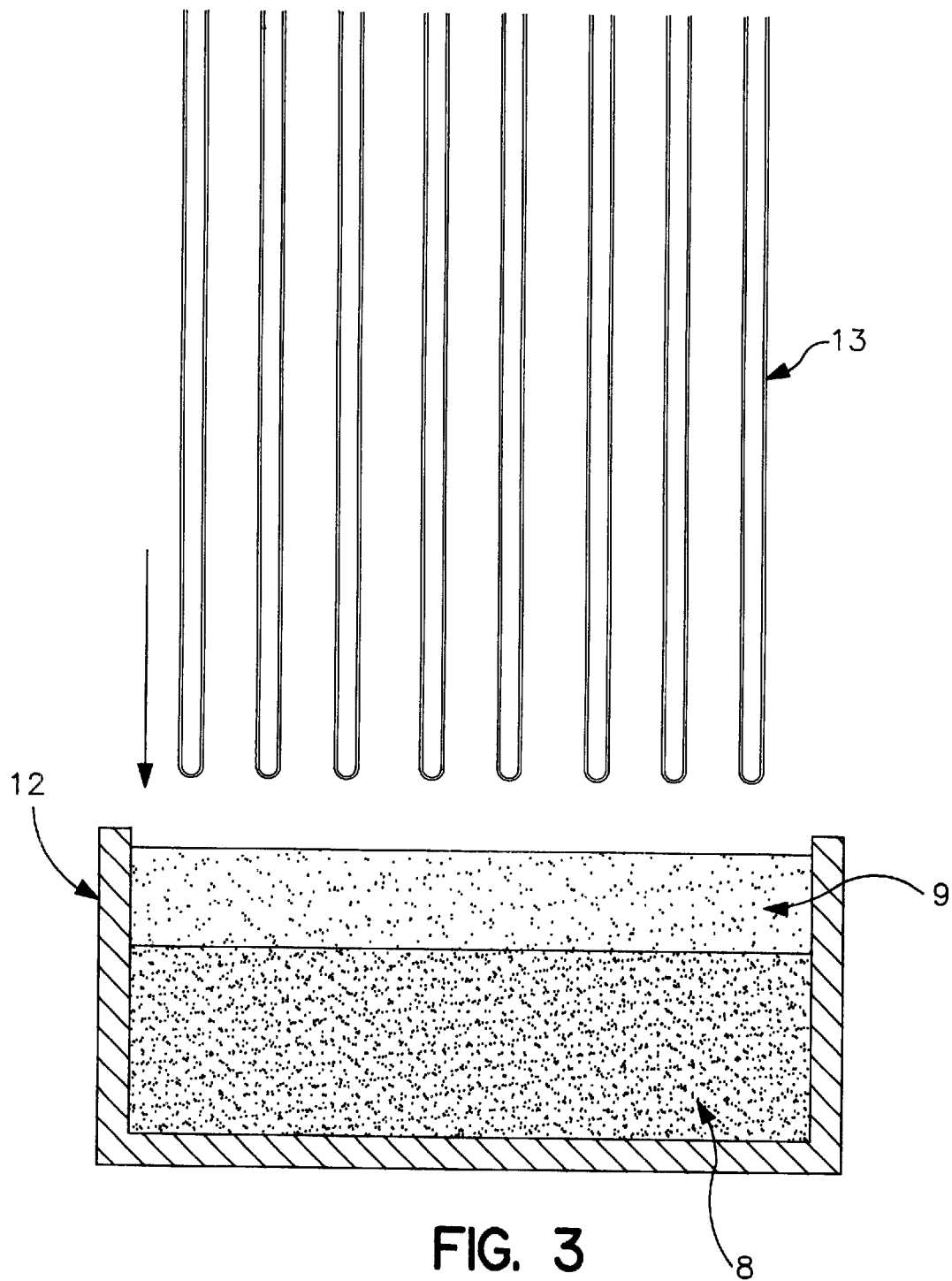
FIG. 3 shows another method of preparation of the multicomponent tubesheets of the present invention.

In another embodiment, the hardness modifying agent described above is placed on top of the hard epoxy resin layer in place of the soft epoxy resin formulation. An example of this process is described with reference to FIG. 3.

As illustrated therein, a predetermined amount of liquid hard epoxy resin 8 is added to a mold 12. The soft epoxy resin 9 is immediately added on top of the hard epoxy resin layer in such a manner that the layers do not intermix. The hollow fiber bundle 13 is slowly lowered into the mold, which holds the striated liquid epoxy compounds. The epoxy layers are then allowed to cure simultaneously. This method may be advantageously employed when there is a substantial difference in density of the two liquid epoxy formulations.

The following examples will further serve to illustrate the methods and materials used to fabricate the multiple component tubesheets of this invention and the improved membrane performance that is obtained from the use of such tubesheets. These examples should not to be construed as limiting.

EXAMPLE 1

Into a mold of 3.2 cm depth and 20.3 cm diameter was poured 208 g of a first epoxy compound consisting of a commercial epoxy resin system sold by Hardman, Inc., under the name of EPOCAP® 17446. This material had a viscosity of about 2500 cps at 25° C. A bundle of about 70,000 hollow fiber membranes was lowered into the mold such that the fibers were encapsulated to a depth of about 1.3 cm. The remainder of the mold was filled with a second epoxy compound. This second epoxy compound was composed of EPOCAP® 17446 that contained 30% by weight of dibutylphthalate plasticizer (viscosity of 384 cps at 25° C.). This second compound was added in the amount of 576 g. The first epoxy compound was not gelled or cured prior to the addition of the second compound, thus there was potential for mixing between the two compounds and formation of a gradual transition from hard to soft consistency along the length of the tubesheet.

The tubesheet was postcured for 2 hours at 120° C. and then allowed to cool to room temperature (25° C.). The Shore D hardness of the epoxy located at the terminal end of the module was measured as 90 while the hardness of the epoxy located at the fiber interface region of the module was measured as 79. The ratio of hard epoxy to soft epoxy was about 0.36:1.

EXAMPLE 2

Into a mold of 3.2 cm depth and 20.3 cm diameter was poured 303 g of a first epoxy compound consisting of Hardman EPOCAP® 17446. A bundle of approximately 70,000 hollow fiber membranes was lowered into the mold such that the ends of the fibers were encapsulated to a depth of about 1.2 cm. This epoxy was gelled for a period of 3 hours and 45 minutes at a temperature of 23° C., after which time a second epoxy compound was poured on top of the first compound. This second compound was added in the amount of 740 g, which was sufficient to cover completely the first epoxy. This second epoxy resin system consisted of a bisphenol F resin known as EPON® 862, an aliphatic diglycidyl ether diluent known as HELOXY® 67, and a polyamido-amine hardener known as EPI-CURE® 3046. All of these materials are commercially available from Shell Chemical Inc.

These components were mixed in a weight ratio of 50/50/100 resin/diluent/hardener to produce a compound with a viscosity of 158 cps at 25° C. to form the soft portion of the tubesheet. Because the second epoxy was added before the first epoxy was completely cured, there was excellent bonding between the two formulations within the tubesheet. The ratio of hard epoxy to soft epoxy in the tubesheet was approximately 0.42:1. After curing the tubesheet for 2 hours at 120° C., the Shore D hardness of the first epoxy, located at the module end, was measured as 89. The Shore D hardness of the second epoxy, located at the fiber interface region of the module, was measured as 37.

EXAMPLE 3

A bundle of approximately 70,000 hollow fiber membranes was potted in a 3.2 cm depth, 20.3 cm diameter mold with a first epoxy casting compound composed of Hardman EPOCAP® 17446. This compound was cured for 2 hours at 120° C. to a Shore D hardness of 90. A second epoxy compound was applied to the periphery of the bundle and was allowed to wick into the center of the bundle. This second epoxy resin system consisted of EPON® 862, HELOXY® 67, and EPI-CURE® 3046. These components were mixed in a weight ratio of 50/50/100 resin/diluent/hardener to produce this portion of the tubesheet. The second epoxy, which was cured for 16 hours at 80° C. to a Shore D hardness of 36, substantially covered the first epoxy. The weight ratio of the hard epoxy to soft epoxy at each potted end of the bundle was approximately 10:1.

Thus, hollow fiber membrane modules with tubesheets composed of a plurality of epoxy compounds were produced. Modules made according to this process had a thin layer of soft epoxy and a thick layer of hard epoxy with virtually no mixing of the layers.

Comparative Example 4

A hollow fiber membrane module was prepared using only a hard epoxy (EPOCAP® 17446) as the tubesheet potting compound. Thus this module was fabricated by using methods described in the prior art and not according to the teachings of the present invention. This module was subjected to air separation testing at a pressure of 10.55 Kg/cm$^2$ and a temperature of 21° C. The module had a separation factor (a) for $O_2/N_2$ of 6.65.

EXAMPLE 4

A hollow fiber membrane module was constructed with the same lot of membrane utilized in Comparative Example 4. This module was potted according to the method described in Example 3. Thus this module had tubesheets that were comprised of about 10 parts of hard epoxy and 1 part of soft epoxy. This module was tested for air separation properties according to the conditions used in Comparative Example 4. It was determined that this module had a separation factor for $O_2/N_2$ of 7.57 at an identical permeation rate to the module in Comparative Example 4. Thus, the module prepared according to the teachings of the present invention had a 14% higher separation factor than the module made according to the prior art with no loss in $O_2$ permeation rate.

Comparative Example 5

A hollow fiber membrane module was prepared and tested according to the same methods described in Comparative Example 4. This module had a separation factor for $O_2/N_2$ of 5.96.

EXAMPLE 5

A hollow fiber membrane module was constructed with the same lot of membrane utilized in Comparative Example 5. This module was potted according to the same protocol described in Example 4. The module displayed a separation factor for $O_2/N_2$ at 7.48 and the same permeation rate as the module in Comparative Example 4. Thus the module prepared according to the teachings of the present invention had a 25% higher separation factor than the module made according to the prior art, with no loss in $O_2$ permeation rate.

Comparative Example 6

A hollow fiber membrane module was prepared by the method described in Comparative Example 4. This module was tested on a feed stream that consisted of 10% $CO_2$ and 90% $CH_4$ at a pressure of 32.2 Kg/cm2 and a temperature of 49° C. This module had a separation factor for $CO_2/CH_4$ of 18.

EXAMPLE 6

A hollow fiber membrane module was constructed with the same lot of membrane utilized in Comparative Example 6. This module was potted according to the same protocol described in Example 4. This module was tested under the same conditions used in Comparative Example 6 and was found to have a $CO_2/CH_4$ separation factor of 26 and a permeation rate of $CO_2$ identical to that of the module in Comparative Example 6. Thus the module prepared according to the teachings of the present invention had a 44% higher separation factor than the module made according to the prior art with no loss in $CO_2$ permeation rate.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A membrane separation module for the separation of gaseous components at high pressure, said module comprising, a bundle of gas separation hollow fiber membranes, each of said membranes having at least one region which is encapsulated by a tubesheet, and an active membrane region which is not encapsulated by said tubesheet;

said tubesheet comprising a cured epoxy resin having, when cured, a comparatively soft epoxy portion and a comparatively hard epoxy portion within said tubesheet, said comparatively hard epoxy portion having a hardness at least 10 shore D units greater than said comparatively soft epoxy portion at a temperature of 25° C.;

said comparatively soft epoxy portion being located at a first end defining an interface between the encapsulated region of said membranes and the active membrane region of said membranes, said comparatively soft epoxy portion being soft and flexible so as to protect the fibers from damage or sealing imperfections at said interface;

said comparatively hard portion being located at a terminal end of said tubesheet located opposite of said first end, said comparatively hard epoxy portion providing durability and mechanical support required for high pressure and temperature separation of gases; and said comparatively hard epoxy portion being in intimate contact with said comparatively soft epoxy portion such that there are substantially no air gaps between said portions, so as to reduce the presence of tubesheet defects which may reduce the selectivity of a gas separation process conducted with said module.

2. The membrane separation module of claim 1, wherein a difference in hardness varies continuously between said first end and said terminal end.

3. The membrane separation module of claim 1 wherein said comparatively hard epoxy portion and said comparatively soft epoxy portion are formed from two distinct epoxy formulations.

4. The membrane separation module of claim 3, wherein a weight ratio of said comparatively hard epoxy portion to said comparatively soft epoxy portion is from about 1000:1 to about 1:10.

5. The membrane separation module of claim 3 wherein said comparatively soft epoxy portion either contains reactive or nonreactive diluents, or is formulated by the use of a stoichiometric excess of epoxy hardener, or both.

6. The membrane separation module of claim 5 wherein said comparatively soft epoxy portion contains said reactive or nonreactive diluents.

7. The membrane separation module of claim 5 wherein said comparatively soft epoxy portion is formulated by the use of a stoichiometric excess of an epoxy hardener.

8. The membrane separation module of claim 3 wherein said comparatively soft epoxy portion has an initial viscosity of about 1500 centipoise or less at 25° C.

9. The membrane separation module of claim 1 wherein the said interface layer is formed by applying a hardness modifying agent on top of an uncured or partially cured hard epoxy formulation layer.

10. The membrane separation module of claim 9 wherein said hardness modifying agent is a reactive or nonreactive diluent.

11. The membrane separation module of claim 10 wherein said reactive diluent is a functional siloxane.

12. The membrane separation module of claim 11 wherein said functional siloxane is an aminofunctional siloxane.

13. The membrane separation module of claim 1, wherein said comparatively soft epoxy portion has a Shore D hardness of less than about 80 units.

14. The membrane separation module of claim 1, wherein said comparatively hard epoxy portion has a Shore D hardness of greater than about 80 units.

15. A process of forming a potted bundle of gas separation hollow fiber membranes for a gas separation module, said process comprising:

a) forming a layer of either a comparatively soft epoxy resin or a hardness modifying agent on top of a comparatively hard epoxy resin to form striated layers having a comparatively hard epoxy portion and a comparatively soft epoxy portion;

b) introducing an end of a gas separation hollow fiber membrane bundle into said striated layers of epoxy such that an end impregnated with said epoxy resins is formed;

c) curing said epoxy resins to form a multicomponent tubesheet; wherein said bundle of gas separation hollow fiber membranes has an active membrane region which is not encapsulated by said tubesheet; said bundle and said tubesheet forming a potted bundle;

said tubesheet comprises a comparatively soft epoxy portion and a comparatively hard epoxy portion within said tubesheet, said comparatively hard epoxy portion having a hardness at least 10 shore D units greater than said comparatively soft epoxy portion at a temperature of 25° C.;

said comparatively soft epoxy portion being located at a first end defining an interface between the encapsulated region of said membranes and the active membrane region of said membranes, said comparatively soft epoxy portion being soft and flexible so as to protect the fibers from damage or sealing imperfections at said interface;

said comparatively hard portion being located at a terminal end of said tubesheet located opposite of said first end, said comparatively hard epoxy portion providing mechanical support required for high pressure and temperature separation of gases; and said comparatively hard epoxy portion being in intimate contact with said comparatively soft epoxy portion such that there are substantially no air gaps between said portions, so as to reduce the presence of tubesheet defects which may reduce the selectivity of a gas separation process conducted with said potted bundle.

16. The process of claim 15 further comprising the step of placing said end impregnated with said epoxy resins into a mold, and backfilling said mold with said soft epoxy resin prior to curing said epoxy resin layers.

17. A process of forming a potted bundle of gas separation hollow fiber membranes for a gas separation module, said process comprising: potting an end of a bundle of gas separation hollow fiber membranes in a comparatively hard epoxy resin and applying a layer of either a comparatively soft epoxy resin or an epoxy resin hardness modifier above said end having said comparatively hard epoxy layer to form a tubesheet; wherein said bundle of gas separation hollow fiber membranes has an active membrane region which is not encapsulated by said tubesheet, said bundle and said tubesheet forming a potted bundle;

said tubesheet comprises a comparatively soft epoxy portion and a comparatively hard epoxy portion within said tubesheet, said comparatively hard epoxy portion having a hardness at least 10 shore D units greater than said comparatively soft epoxy portion at a temperature of 25° C.;

said comparatively soft epoxy portion being located at a first end defining an interface between the encapsulated region of said membranes and the active membrane region of said membranes, said comparatively soft epoxy portion being soft and flexible so as to protect the fibers from damage or sealing imperfections at said interface;

said comparatively hard portion being located at a terminal end of said tubesheet located opposite of said first end, said comparatively hard epoxy portion providing mechanical support required for high pressure and temperature separation of gases; and said comparatively hard epoxy portion being in intimate contact with said comparatively soft epoxy portion such that there are substantially no air gaps between said portions, so as to reduce the presence of tubesheet defects which may reduce the selectivity of a gas separation process conducted with said potted bundle.

18. A process of claim 17 wherein said comparatively hard epoxy layer is cured prior to introduction of said comparatively soft epoxy layer.

19. A process of claim 17 wherein said comparatively soft epoxy resin or epoxy resin hardness modifier is introduced through a central region of the bundle.

20. A process of claim 17 wherein said comparatively soft epoxy resin or epoxy resin hardness modifier is introduced from an exterior region of the bundle.

* * * * *